(12) United States Patent
Koskimies

(10) Patent No.: US 7,761,590 B2
(45) Date of Patent: Jul. 20, 2010

(54) METHOD, APPARATUS, MOBILE TERMINAL AND COMPUTER PROGRAM PRODUCT FOR CONVERTING FROM A FIRST FORMS MARKUP LANGUAGE TO A SECOND FORMS MARKUP LANGUAGE

(75) Inventor: Oskari Koskimies, Helsinki (FI)

(73) Assignee: Nokia Corporation, Espoo (FI)

( * ) Notice: Subject to any disclaimer, the term of this patent is extended or adjusted under 35 U.S.C. 154(b) by 588 days.

(21) Appl. No.: 11/423,542

(22) Filed: Jun. 12, 2006

(65) Prior Publication Data

US 2007/0288657 A1    Dec. 13, 2007

(51) Int. Cl.
G06F 15/16    (2006.01)
(52) U.S. Cl. .................. 709/232; 709/218; 709/219; 709/223
(58) Field of Classification Search ............... 709/218, 709/219, 223, 232
See application file for complete search history.

(56) References Cited

U.S. PATENT DOCUMENTS

| 6,173,316 B1* | 1/2001 | De Boor et al. ............ 709/218 |
| 7,356,572 B2* | 4/2008 | Jiang et al. ................. 709/217 |
| 2004/0003341 A1 | 1/2004 | alSafadi et al. |

* cited by examiner

Primary Examiner—Vivek Srivastava
Assistant Examiner—Adnan Mirza
(74) Attorney, Agent, or Firm—Alston & Bird LLP

(57) ABSTRACT

An apparatus includes an adaptation proxy which is configured to receive data in a first form markup language that is intended for a client device and adapt portions of the received data which are incompatible with the client device into a second form markup language that is compatible with the client device. The adaptation proxy is further configured to replace validation elements in the first form markup language with corresponding constraints in the second form markup language. The first form markup language may be the full XForms standard, while the second form markup language may be XForms Basic.

14 Claims, 4 Drawing Sheets

☐Years ☐Months ☐Days ☐Hours ☐Minutes ☐Seconds

METHOD, APPARATUS, MOBILE TERMINAL AND COMPUTER PROGRAM PRODUCT FOR CONVERTING FROM A FIRST FORMS MARKUP LANGUAGE TO A SECOND FORMS MARKUP LANGUAGE

TECHNOLOGICAL FIELD

Embodiments of the present invention relate generally to conversion between first and second forms markup languages and, more particularly, relate to a method, apparatus, and computer program product for enabling schema compatibility for mobile XForms.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In certain applications, it is necessary for the user to enter data into forms. XForms represent the next generation forms markup, which replaces traditional forms in, for example, XHTML 2.0. XForms can also be used with other markups such as synchronized media integration language (SMIL). XForms provide certain advantages such as device independency, separation of data from presentation, and compatibility with extensible markup language (XML) infrastructure. However, standard XForms also have disadvantages. For example, standard XForms implementations can be heavy in resource consumption for certain platforms such as mobile terminals which have limited resources. Accordingly, XForms Basic, which uses a simpler syntax, was developed in order to provide mobile terminals with a more lightweight profile of XForms. However, standard XForms use Schemas for user input validation, and Schemas are not supported in XForms Basic. Thus, if a particular service uses Schemas for validation, a mobile implementation will neither be able to validate user input, nor have access to data type information which could be essential to providing an advantageous usability (such as allowing data input via a particular data input widget). Schema information is typically delivered in a separate file which a form file refers to in XForms by using a schema attribute of a model element.

Accordingly, there is a need for providing compatibility between forms markup languages such as between XForms Basic, or mobile XForms, and the data types and Schema associated with the full XForms standard. This is particularly the case in mobile environments where resources may be limited and thus, it is important that increased capability be provided with resources that can be efficiently employed.

BRIEF SUMMARY

A method, apparatus and computer program product are therefore provided to enable conversion between first and second forms markup languages such as by allowing Schema compatibility for XForms Basic. In particular, a method, apparatus and computer program product are provided that enables an adaptation proxy to map Schema into XForms Basic.

In one exemplary embodiment, a method of providing conversion between forms markup languages is provided. The method includes receiving data in a first form markup language that is intended for a client device, and adapting portions of the received data which are incompatible with the client device into a second form markup language that is compatible with the client device. Adapting portions of the received data may include replacing validation elements in the first form markup language with corresponding constraints in the second form markup language. The first form markup language may be the full XForms standard, while the second form markup language may be XForms Basic.

In another exemplary embodiment, a computer program product for providing conversion between forms markup languages is provided. The computer program product includes at least one computer-readable storage medium having computer-readable program code portions stored therein. The computer-readable program code portions include first and second executable portions. The first executable portion is for receiving data in a first form markup language that is intended for a client device. The second executable portion is for adapting portions of the received data which are incompatible with the client device into a second form markup language that is compatible with the client device. The second executable portion may include instructions for replacing validation elements in the first form markup language with corresponding constraints in the second form markup language.

In another exemplary embodiment, an apparatus for providing conversion between forms markup languages is provided. The apparatus includes an adaptation proxy which is configured to receive data in a first form markup language that is intended for a client device and adapt portions of the received data which are incompatible with the client device into a second form markup language that is compatible with the client device. The first form markup language may be the full XForms standard, while the second form markup language may be XForms Basic. The adaptation proxy is further configured to replace validation elements in the first form markup language with corresponding constraints in the second form markup language.

In another exemplary embodiment, an apparatus for providing conversion between forms markup languages is provided. The apparatus includes means for receiving data in a first form markup language that is intended for a client device, and means for adapting portions of the received data which are incompatible with the client device into a second form markup language that is compatible with the client device. Adapting portions of the received data may include replacing validation elements in the first form markup language with corresponding constraints in the second form markup language.

Embodiments of the invention may provide a method, apparatus and computer program product for advantageous employment in mobile terminals or other environments in which it is desirable to maximize compatibility with the full XForms standard without the corresponding resource consumption requirements that accompany the full XForms standard. As a result, for example, mobile terminal users may enjoy improved data processing capabilities without appreciably increasing memory and resource consumption of the mobile terminal.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
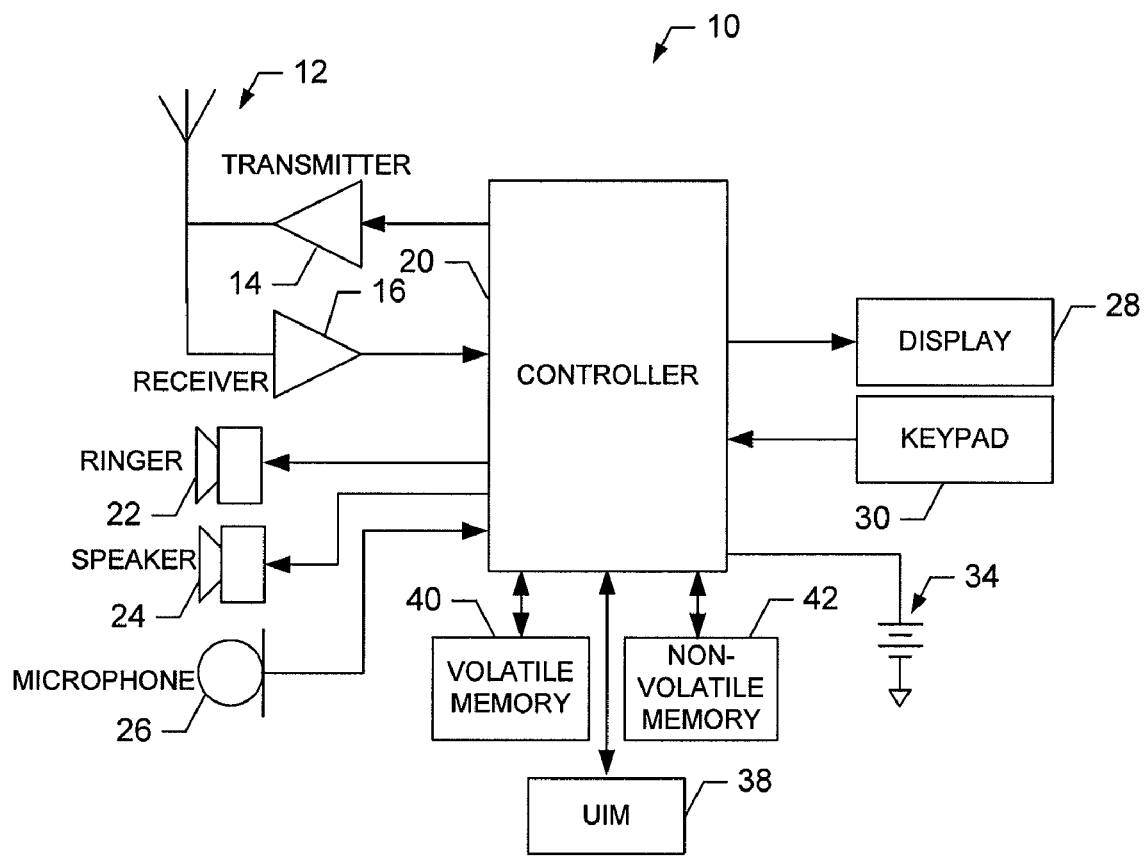
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a universal identity element (UIM) 38. The UIM 38 is typically a memory device having a processor built in. The UIM 38 may include, for example, a subscriber identity element (SIM), a universal integrated circuit card (UICC), a universal subscriber identity element (USIM), a removable user identity element (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
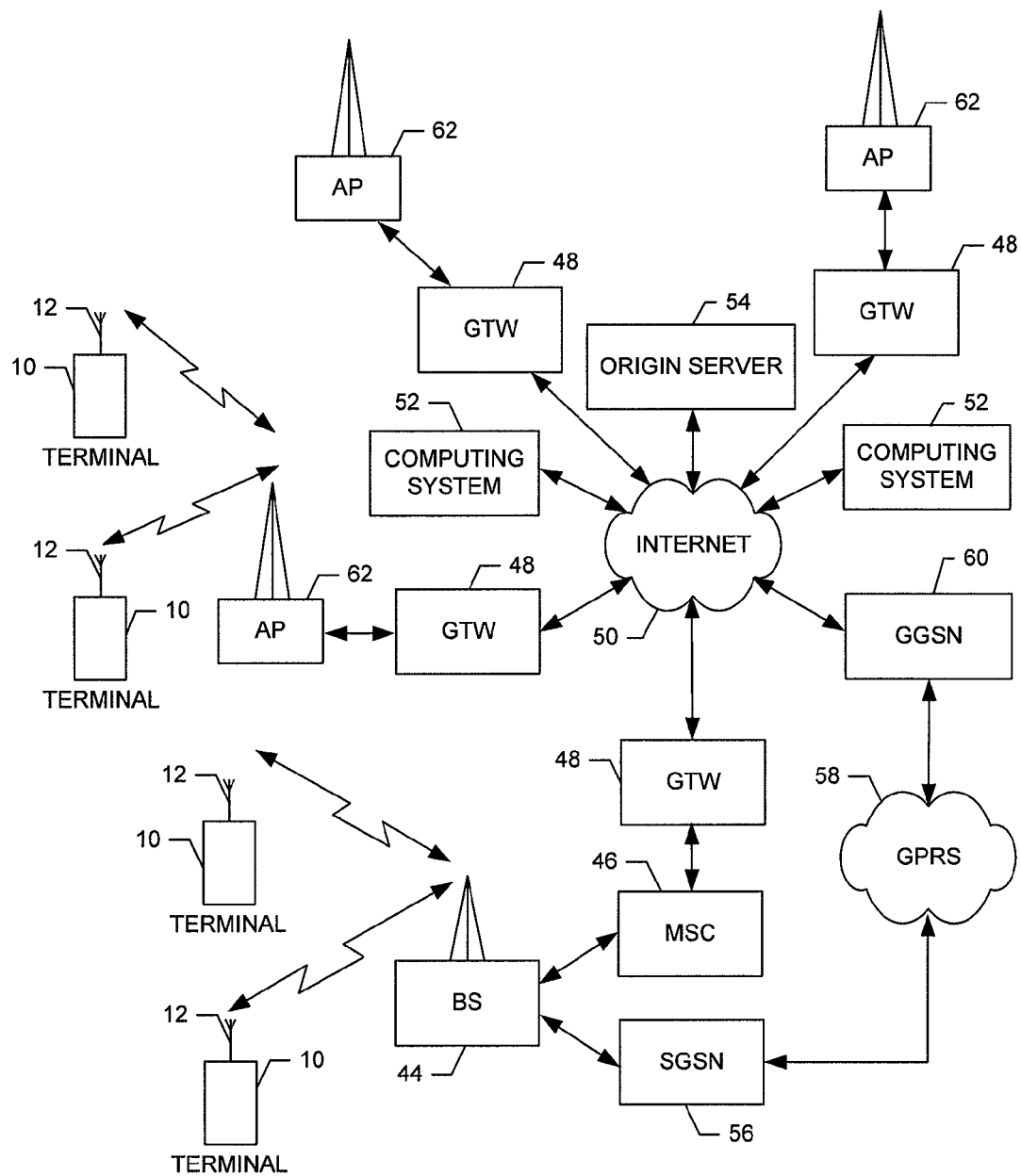
FIG. 2 is a schematic block diagram of a wireless communications system according to an exemplary embodiment of the present invention.

Referring now to FIG. 2, an illustration of one type of system that would benefit from the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figures 3, 4:
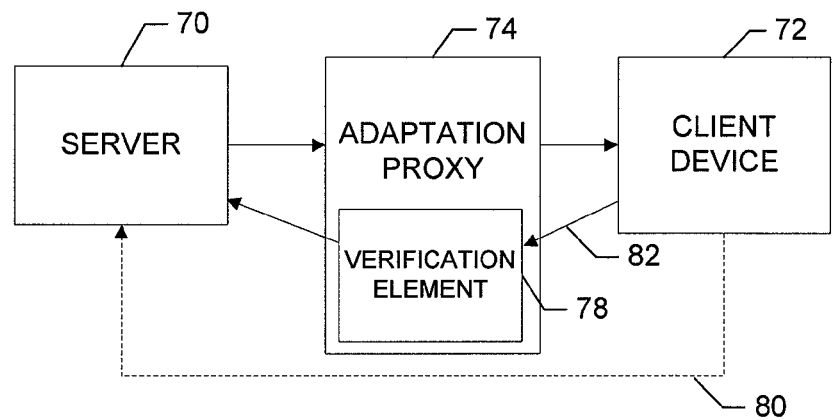
FIG. 3 illustrates a block diagram of portions of a system for providing Schema compatibility with mobile XForms according to an exemplary embodiment of the present invention.
FIG. 4 is an example of six separate form controls for duration entry according to an exemplary embodiment of the present invention.

An exemplary embodiment of the invention will now be described with reference to FIG. 3, in which certain elements of a system for providing Schema compatibility for mobile XForms are illustrated. The system of FIG. 3 may be employed, for example, on the wireless communications system of FIG. 2. As such, the BS 44 and the APs 62 may serve to divide between client side devices (i.e., the mobile terminal 10) and server side devices (i.e. the origin server 54, the computing system 52, the GTW 48, etc.). In this regard, embodiments of the present invention may be advantageously employed on server side devices. However, it should be noted that the system of FIG. 3, may also be employed on a variety of other devices and systems, both mobile and fixed, and therefore, embodiments of the present invention should not be limited to application on devices such as those illustrated in FIG. 2. It should also be noted that while FIG. 3 illustrates one example of a configuration of a system for providing conversion between forms markup languages, numerous other configurations may also be used to implement embodiments of the present invention. Furthermore, although FIG. 3 will be described in the context of conversion between Schema and XForms Basic to illustrate an exemplary embodiment, it should be noted that embodiments of the present invention need not necessarily be practiced in the context of conversion between Schema and XForms Basic, but instead applies any conversion between a protocol for converting between a first forms markup language and another forms markup language.

Referring now to FIG. 3, a system for providing Schema compatibility for mobile XForms is provided. The system includes a server 70 in communication with a client device 72 via an adaptation proxy 74. The server 70 may be any device or means embodied in either hardware, software, or a combination of hardware and software capable of storing information, data or applications which are accessible by client devices, for example, via a network such as the network of FIG. 2. In an exemplary embodiment, the server 70 may execute a service such as a forms application for receiving information or data from the client device 72 in a particular format specified in accordance with the full XForms standard. Meanwhile, it will be assumed that the client device 72 employs, for example, a browser or other application which supports XForms Basic. Thus, since the full XForms standard includes Schema and certain other data types that are not supported by XForms Basic, which uses a simpler constraint syntax, if the service uses Schema for validation, the client device 72 would not normally be able to validate user input at the client device 72. As such, the adaptation proxy 74 is configured to adapt Schema elements into a format that may be compatible with XForms basic, thereby enabling the client device 72 to validate user input thus providing Schema compatibility with XForms Basic.

The adaptation proxy 74 may be any device or means embodied in either hardware, software, or a combination of hardware and software capable of providing an adaptation between a first forms markup language such as that provided by the full XForms standard and a second forms markup language such as XForms Basic. It should be noted that although the adaptation proxy 74 is shown as a separate element in FIG. 3, the adaptation proxy 74 and the server 70 may be collocated or embodied in a single element or device capable of performing the functions of both the adaptation proxy 74 and the server 70. Alternatively, the adaptation proxy 74 may be disposed at any server side device which is capable of communication with both the server 70 and the client device 72. In an exemplary embodiment, the adaptation proxy 74 may be embodied in software that is stored at the server 70 or at some other server side device and operated under the control of a processing element. The processing element may be embodied in many ways. For example, the processing element may be embodied as a processor, a coprocessor, a controller or various other processing means or devices including integrated circuits such as, for example, an ASIC (application specific integrated circuit).

In order to understand operation of the adaptation proxy 74, some background information is provided. As stated above, XForms is an XML format for specification of user interfaces, and more specifically web forms. Web forms allow a user of the client device 72 to enter data that may be sent to the server 70 for processing. Web forms often mimic the usage of paper forms. The web forms can be used to submit data to save on the server 70 (e.g., information for ordering a product) or can be used to retrieve data (e.g., searching for information on a search engine). XForms (which will interchangeably be referred to as the full Xforms standard) was designed to be the next generation of HTML/XHTML forms standard to enable device independency with regard to web forms. However, due to relatively large resource consumption associated with XForms, the more lightweight XForms Basic was developed in order to enable usage of a version of XForms with mobile terminals. Unfortunately, XForms include Schema and certain data types that are not supported in XForms Basic. There are at least three defined types that are not supported in XForms Basic. Additionally, it is possible for user-defined types to be produced which are not supported by XForms Basic. For example, a complicated custom made regular expression may not be supported. Schema capture data model constraints and are used for validation. Schema may be used to specify data types for form data, which an XForms/XForms Basic client then uses to select a particular data input widget (e.g., a calendar tool may be used to input date information). Although XForms Basic does not support Schema, XForms Basic includes certain mechanisms which may be utilized to serve as a proxy between Schema and XForms Basic.

In this regard, data in the full XForms standard which is sent from the server 70 may place constraints on user input at the client device 72 using either bind elements or Schema. Thus, since only bind elements are available in XForms Basic, it may be possible to express many common restraints in terms of bind elements. Accordingly, the adaptation proxy 74 may be configured to translate between Schema and corresponding bind elements that approximate the constraints specified using the Schema. In an exemplary embodiment, the adaptation proxy 74 may utilize a mapping function such as any provided in the examples below, which approximates constraints specified using Schema in corresponding bind elements that are usable with XForms Basic.

Bind elements allow the following properties to be specified for an input control:

"type" (specifies a standard data type for the value, e.g. string or date)

"readonly" (specifies whether value can be changed by user)

"required" (specifies whether value is required in order for the form content to be valid)

"relevant" (specifies whether the value is currently relevant to the form—irrelevant parts of the form are either disabled or completely invisible)

"constraint" (specifies an arbitrary XPath statement that must be true if the form content is to be valid)

"calculate" (specifies an arbitrary XPath statement which is used to calculate the value, possibly based on other values)

Any constraints on allowable values that are specified in the Schema, can also be expressed using the "constraint" property if the constraint can be expressed as an XPath expression. A limitation may be presented in that for regular expressions sometimes used for fields like social security numbers, it may not always be possible to accurately represent an arbitrary regular expression using XPath since XPath does not support regular expressions. However, for most cases it may be desirable to validate only standard data types and thus the limitation above is only minor. Also, many common regular expressions can be represented with XPath.

It may be possible to use temporary variables in XPath calculations by adding new instance elements to a form (similar to hidden fields in an HTML form) via the adaptation proxy 74. In an exemplary embodiment, temporary variables may be used to force collapsing of whitespace for a user-entered value. As such, for example, a value entered by the user may be initially stored into the temporary variable, and an actual result element would have a final value achieved using a "calculate" property and a "normalize-space( )" XPath function. The temporary or "new variables" may have constraint properties of their own. Additionally, new variables could be used as a form of function definitions by using the "calculate" property (at least when used from an event handler). Thus multiple step conversions involving intermediate values or temporary variables may be defined to enable more complex translations than merely those simple translations provided below as examples.

In an exemplary embodiment, the adaptation proxy 74 may include a verification element 78 which performs constraint checking. As such, the verification element 78 may check any changed value to ensure that the changed value is valid. For example, the server 70 may communicate forms data meant for an XForms standard capable client device to the adaptation proxy 74. The adaptation proxy 74 may map any Schema elements of the forms data into corresponding constraints using selected binding elements if the constraints can be expressed using an XPath expression. The verification element 78 may be employed to check whether the Schema elements may be expressed as an XPath expression before communicating the corresponding constraints to the client device 72, which employs XForms Basic. If Schema elements are not capable of expression in XPath, the client device 72 may receive an error message to indicate as much. At this point the transaction may be aborted if client-side validation is desired to be perfect. Alternatively, if partial client-side validation is acceptable, the user may be allowed to continue with filling in the form. If there was no error, or partial client-side validation is acceptable, the user may then enter data which a browser on the client device 72 may be able to validate. The entered data may then be communicated back to the adaptation proxy 74. In an exemplary embodiment, the adaptation proxy 74 may communicate the entered data to the verification element 78, which validates the entered data. If the verification element 78 is able to validate the entered data, then the entered data may be communicated to the server 70. However, if the verification element 78 is not able to validate the entered data, then an error message may be communicated to the client device 72, to inform the client device 72 that the entered data is invalid and was not communicated to the server 70. At this point the user may be allowed to correct or re-enter the data.

Thus, according to alternative exemplary embodiments shown in FIG. 3, the adaptation proxy 74 may be configured to translate form data before it is presented to the client device 72 and then reply data from the client device 72 may be submitted directly from the client device 72 to the server as shown by dotted line 80. Alternatively, the adaptation proxy 74 may be configured to translate from data as described above and then capture reply data from the client device 72 at the verification element 78 as shown by solid line 82. As such, the reply data may be validated at the verification element as described above.

Examples of numerous specific translations or mapping operations for mapping Schema definitions to XForms Basic using binding elements and XPath expressions for constraints will be provided below. It should be noted, however, that the mapping expressions described below are not meant to be an exhaustive list. Rather, the expressions provided below are merely offered by way of example and not of limitation. Thus, the examples offered below are provided in order to enable one of skill in the art to implement embodiments of the invention, and the examples below do not disclose every possible implementation.

In order to implement an exemplary embodiment of the invention, a mapping from a Schema type definition to one or more bind elements may be performed. In this regard, simple type definitions (i.e. non-structured types) may be mapped as shown in the tables below. Simple type definitions may include built-in types (which may include built-in primitive types and built-in derived types) and user defined types. Complex (structured) type definitions may be handled in similar fashion to that of simple type definitions, i.e. by validating each sub-type separately.

For each Schema data type, a resulting basic type, (e.g. "Integer", "Date"), which allows the user to select an appropriate input widget, and a constraint (e.g. ">0"), which is used to validate user input must be defined in order to map a particular Schema element into a corresponding bind element or elements in XForms Basic. The following XPath functions may be helpful when validating and/or processing particular values:

concat(value1, . . . , value n)—returns concatenation of parameters contains(value, substring)—checks whether value contains substring format-number(value, format)—formats a number for display normalize-space(value)—removes leading and trailing whitespace and collapses repeating whitespace starts-with(value, substring)—tests if value starts with substring string-length(value)—returns length of string substring(value, start, length)—returns specified part of a string substring-after(value, substring)—returns part after specified substring substring-before(value, substring)—returns part before specified substring translate(value, from, to)—replace characters with other characters in a string

TABLE 1

| Schema Data Type | Basic Type | Additional Constraints |
| --- | --- | --- |
| float | decimal | None |
| double | decimal | None |
| duration | string | P<#years>Y<#months>M<#days>D T<#hours>H<#minutes>M<#seconds>S (can prefix entire string with minus to indicate negative duration) Poorly human-writable; Adaptation should change a form control with this input type to six separate form controls (one for years, one for months, etc.) that each take a number, and then build the string from the numbers. Instead of number inputs, other form controls such as sliders may also be used. |
| hexBinary | base64Binary | Must be translated to hexBinary on server side. |
| QName | string | Contains at most one colon character. The parts (before and after colon, or whole string if no colon) must begin with letter or underscore and have limitations on legal characters. |
| NOTATION | string | Limitations on legal characters. |

Table 1 shows an exemplary Schema data type and corresponding binding elements including a basic type and additional constraints which may be utilized to map the Schema element into a format compatible with XForms Basic for certain selected built-in primitive types. Schema data types in Table 1, which are bold (i.e., float, double and duration) correspond to Schema data types that may be entered by the user and thus require validation. Directions for validating these types are given below.

For float and double, value space may be restricted, but lexical space may be compatible with decimal. Thus no extra validation is necessary. Since duration form controls may be complex such as requiring input by a particular data input widget, it may be advantageous to split data for entry into six separate form controls at the client device 72 as shown in FIG. 4. For example, a Schema element may be directed to a durational data type which specifies entry using a particular data entry widget such as a slider bar which is used to select a duration of time. In mapping the Schema element into constraints that approximate the validation requirements of the Schema element, the adaptation proxy 74 may split data into the six separate form controls of FIG. 4. In this regard, it may be desirable to check that each of the separate form controls can only input a (positive) number, which may be done, for example, by setting the type as "nonNegativeInteger". In an exemplary embodiment, temporary variables or temporary data items (i.e., another instance data) may be employed to replace form data that is not submitted, or provide required values not entered by the user.

TABLE 2

| Schema Data Type | Basic Type | Additional Constraints |
| --- | --- | --- |
| normalizedString | string | Must not contain carriage return, line feed or tab characters. |
| token | string | As normalizedString, in addition: no leading or trailing space, no adjacent space characters. |
| language | string | Must be a valid language identifier as specified in RFC 1766. |
| NMTOKEN | string | Limitations on legal characters. |
| NMTOKENS | string | Whitespace-separated list of NMTOKEN:s. |
| Name | string | Must begin with letter, underscore or colon and has limitations on legal characters. |
| NCName | string | Must begin with letter or underscore and has limitations on legal characters. |
| ID | string | As NCName. |
| IDREF | string | As NCName. |
| IDREFS | string | Whitespace-separated list on IDREF:s. |
| ENTITY | string | As NCName. |
| ENTITIES | string | As IDREFS. |

Table 2 shows an exemplary Schema data type and corresponding binding elements including a basic type and additional constraints which may be utilized to map the Schema element into a format compatible with XForms Basic for certain selected built-in derived types. Again, Schema data types in table 2, which are bold (i.e., normalizedString, token and language) correspond to Schema data types that may be entered by the user and thus require validation. Directions for validating these types are given below.

NormalizedString may be easily handled by converting linefeeds, carriage returns and tabs to normal space characters with "translate( )". Token can be supported by simply applying "normalize-space( )" after an application of "translate( )" as above. Language must be one of a specified set of strings. An exemplary way to validate such a value is to check whether the value can be found in a pre-built string, for example, by using delimiters to prevent ambiguities. An example of such a delimiter may be: contains ("#one#two#three#four#", "#two#").

In XML Schema, new simple types can be user-defined by giving restrictions to existing types. The following restrictions are examples of possible restrictions:

length—value length must be exactly a length value listed minLength—value length must be at least a minimum length value listed maxLength—value length must be no more than a maximum length value listed pattern—value must match specified regular expression enumeration—value must be in a specified list of values whitespace—whitespace handling of value can be specified (e.g. collapse whitespace)

maxInclusive—Value must be greater than or equal to a maximum value listed maxExclusive—Value must be smaller than a maximum value listed minExclusive—Value must be greater than a minimum value listed minInclusive—Value must be at less than or equal to a minimum value listed totalDigits—Decimal value must have no more digits than a specified number fractionDigits—Decimal value must have no more fraction digits than a specified number Examplary validations of some of the restrictions listed above follow. For example, length, minLength, and max-Length may employ a "string-length( )" function. Not all patterns (and indeed not all regular expressions) can be expressed in XPath. Accordingly, in such cases which cannot be expressed in XPath, server-side validation may be used. However, many common regular expression constructs can be emulated. For example, in order to match string S against "ab.*cd.*ef", it may be possible to first verify that string S begins with "ab" and ends with "ef" using code such as: starts-with(S, "ab") and substring(S, string-length(S)—string-length("ef")+1, string-length("ef")="ef". Second, it may be possible to check that middle part contains "cd", for example, using code such as: contains(substring(S, string-length("ab"), string-length(S)—string-length("ab")—string-length ("ef")), "cd"). To verify that the string S contains only characters in string C, it may be possible to do the comparison: translate(S, C, "")="". On the other hand, to verify that the string S does not contain any characters from C, it may be possible to do the comparison: translate(S, C, "")=S. In order to count the number of times characters from string C appears in the string S, it may be possible to perform: string-length(S)—string-length(translate(S, C, "")). Enumeration can be handled either with a straight string comparison such as, for example: value="alternative1" or value="alternative 2" or ... or value="alternativeN", or by using a list string and a delimiter character if the possible values do not contain the delimiter such as, for example: contains ("#alternative1#alternative2#. . . #alternativeN#", concat ("#", value, "#")). Whitespace may be validated by replacing the whitespace option with "translate( )". Meanwhile, the collapse option may be replaced with "normalize-space( )". MaxInclusive, maxExclusive, minExclusive, minInclusive may be replaced by normal value comparison (i.e., <, >, <=, >=). TotalDigits may be replaced using, for example: string-length(value)—string-length(translate(S, "01234567890", "")). Accordingly, a specified number of digits may be ensured. FractionDigits may be replaced by, for example: substring-after(value, "."). Thus, a portion of the value after a decimal point may be specified to include a specified number of digits, for example, using totalDigits.

It should be noted again that the preceding information is provided for purposes of example and not of limitation. Thus, even the particular validations described above may be achieved by other validation mechanisms. Accordingly, the disclosure above should not be understood to express the only mechanism by which validations may be performed.

Figure 5:
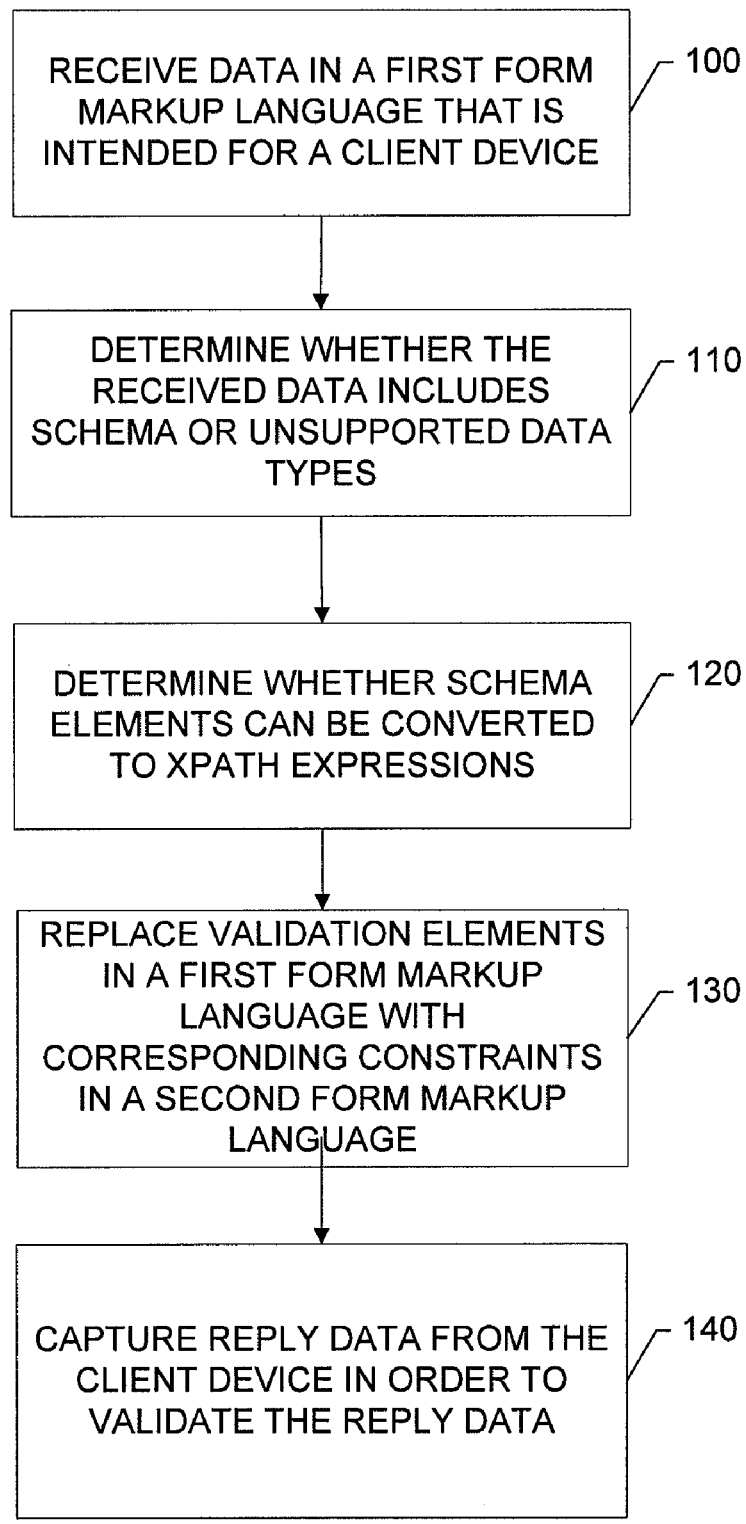
FIG. 5 is a flowchart of a method for providing Schema compatibility for mobile XForms according to an exemplary embodiment of the present invention.

FIG. 5 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing conversion between forms markup languages includes receiving data in a first form markup language that is intended for a client device at operation 100. At operation 130, portions of the received data which are incompatible with the client device are adapted into a second form markup language that is compatible with the client device. Operation 130 may be performed by the adaptation proxy replacing validation elements in the first form markup language with corresponding constraints in the second form markup language. In an exemplary embodiment, the first form markup language is full XForms standard and the second form markup language is XForms Basic. Operation 130 may be accomplished by mapping a conversion between Schema data types in the full Xforms standard to corresponding constraints based upon data stored by the adaptation proxy that define the conversions, such as represented above in Tables 1 and 2. As such, the mapping may include providing a bind element to designate an XForm Basic data type and an additional constraint corresponding to each Schema data type. The exemplary method above may include optional operations 110 and 120. At operation 110, a determination is made, typically by the adaptation proxy, as to whether the received data includes Schema elements or data types that are not supported in the second form markup language. Then at operation 120, a determination, also typically by the adaptation proxy, may be made as to whether the Schema elements are capable of conversion into an XPath expression. At optional operation 140, reply data from the client device may be captured by the verification element in order to validate the reply data. If the reply data is validated by the verification element, the reply data may be communicated to a server. If the reply data is not validated, an error message may be returned to the client device in order to indicate that the reply data has not been validated. At this point the user may be allowed to correct or re-enter the data.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a non-transitory computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving data in a first form markup language comprising full XForms standard, the received data being intended for a client device;
   adapting portions of the received data which are incompatible with the client device into a second form markup language comprising XForms Basic that is compatible with the client device;
   capturing reply data from the client device in order to validate the reply data; and
   sending an error message to the client device in response to the reply data failing to validate and communicating the reply data to a server providing the data in the first markup language in response to the reply data validating,
   wherein adapting portions of the received data comprises replacing validation elements in the first form markup language with corresponding constraints in the second form markup language based on a mapping for conversion between Schema data types in full Xforms standard to corresponding constraints, and
   wherein the mapping includes providing a bind element to designate an XForms Basic data type and additional constraint corresponding to each Schema data type.

2. A method according to claim 1, further comprising determining whether the received data includes Schema elements prior to adapting portions of the received data.

3. A method according to claim 2, further comprising determining whether the Schema elements are capable of conversion into an XPath expression prior to adapting portions of the received data.

4. A method according to claim 1, further comprising determining whether the received data includes data types that are not supported in XForms Basic prior to adapting portions of the received data.

5. A computer program product comprising at least one computer-readable storage medium having computer-readable program code portions stored therein, the computer-readable program code portions comprising:
   a first executable portion for receiving data in a first form markup language comprising full XForms standard, the received data being intended for a client device;
   a second executable portion for adapting portions of the received data which are incompatible with the client device into a second form markup language comprising XForms Basic that is compatible with the client device;
   a third executable portion for capturing reply data from the client device in order to validate the reply data; and
   a fourth executable portion for sending an error message to the client device in response to the reply data failing to validate and communicating the reply data to a server providing the data in the first markup language in response to the reply data validating,
   wherein the second executable portion includes instructions for replacing validation elements in the first form markup language with corresponding constraints in the second form markup language based on a mapping for conversion between Schema data types in full Xforms standard to corresponding constraints, and
   wherein the mapping includes providing a bind element to designate an XForms Basic data type and additional constraint corresponding to each Schema data type.

6. A computer program product according to claim 5, further comprising a fifth executable portion for determining whether the received data includes Schema elements prior to adapting portions of the received data.

7. A computer program product according to claim 6, further comprising a sixth executable portion for determining whether the Schema elements are capable of conversion into an XPath expression prior to adapting portions of the received data.

8. A computer program product according to claim 5, further comprising a fifth executable portion for determining whether the received data includes data types that are not supported in XForms Basic prior to adapting portions of the received data.

9. An apparatus comprising a processor and a memory including computer program code, the memory and the computer program code configured to, with the processor, cause the apparatus at least to:
   receive data in a first form markup language comprising full XForms standard, the received data being intended for a client device;
   adapt portions of the received data which are incompatible with the client device into a second form markup language comprising XForms Basic that is compatible with the client device;
   capture reply data from the client device in order to validate the reply data; and
   send an error message to the client device in response to the reply data failing to validate and communicate the reply data to a server providing the data in the first markup language in response to the reply data validating,
   wherein the memory and computer program code are further configured to, with the processor, replace validation elements in the first form markup language with corresponding constraints in the second form markup language based on a mapping for conversion between Schema data types in full Xforms standard to corresponding constraints, and
   wherein the mapping includes providing a bind element to designate an XForms Basic data type and additional constraint corresponding to each Schema data type.

10. An apparatus according to claim 9, wherein the memory and computer program code are further configured to, with the processor, cause the apparatus to determine whether the received data includes Schema elements prior to adapting portions of the received data.

11. An apparatus according to claim 10, wherein the memory and computer program code are further configured to, with the processor, cause the apparatus to determine whether the Schema elements are capable of conversion into an XPath expression prior to adapting portions of the received data.

12. An apparatus according to claim 9, wherein the memory and computer program code are further configured to, with the processor, cause the apparatus to determine whether the received data includes data types that are not supported in XForms Basic prior to adapting portions of the received data.

13. An apparatus according to claim 9, wherein the apparatus is embodied as a server.

14. An apparatus comprising:
   means for receiving data in a first form markup language comprising full XForms standard, the received data being intended for a client device;
   means for adapting portions of the received data which are incompatible with the client device into a second form markup language comprising XForms Basic that is compatible with the client device;
   means for capturing reply data from the client device in order to validate the reply data; and
   means for sending an error message to the client device in response to the reply data failing to validate and communicating the reply data to a server providing the data in the first markup language in response to the reply data validating,
   wherein adapting portions of the received data comprises replacing validation elements in the first form markup language with corresponding constraints in the second form markup language based on a mapping for conversion between Schema data types in full Xforms standard to corresponding constraints, and
   wherein the mapping includes providing a bind element to designate an XForms Basic data type and additional constraint corresponding to each Schema data type.

* * * * *